UNITED STATES PATENT OFFICE 2,648,406

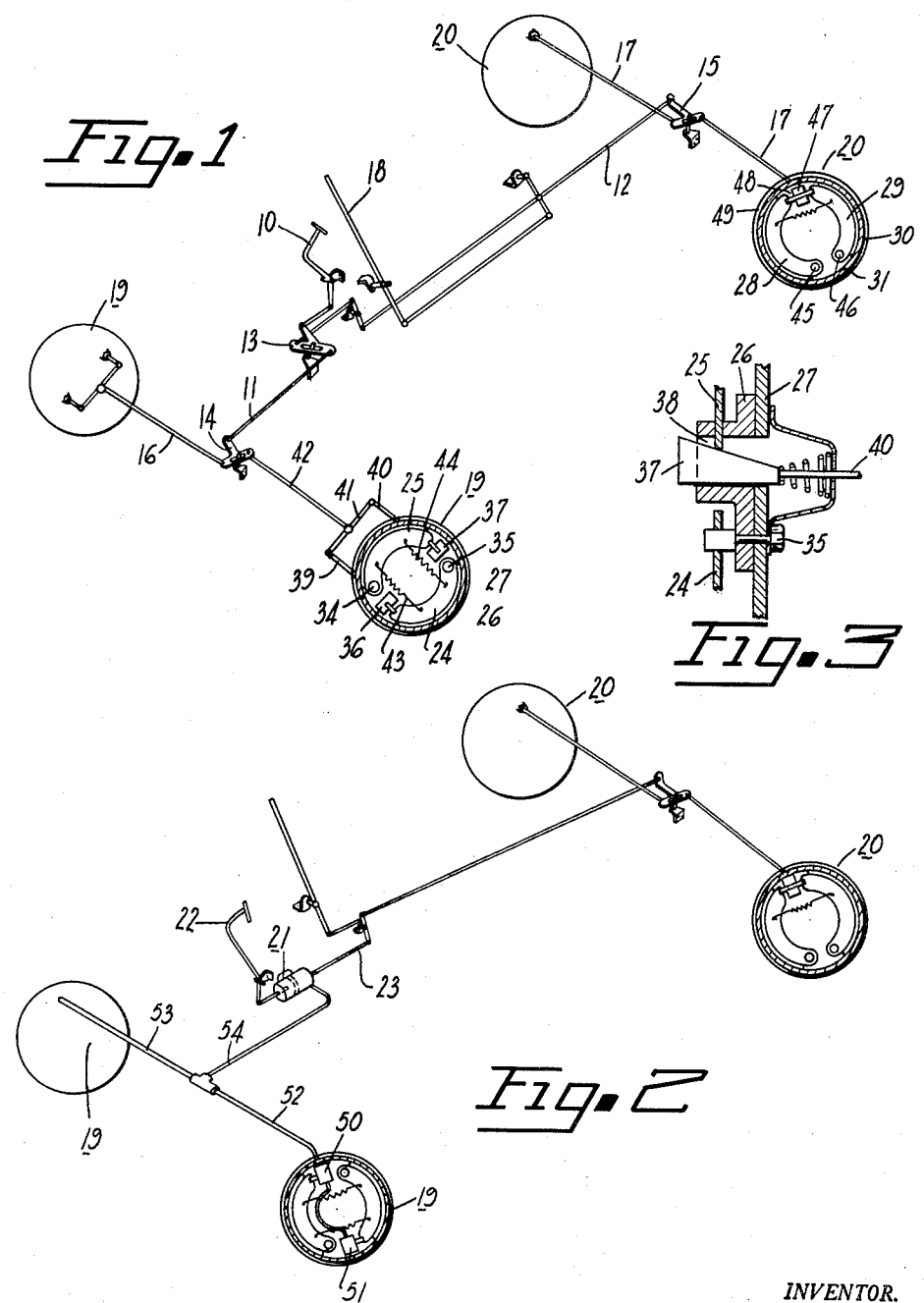
Aug. 11, 1953  G. P. ROBERTS  2,648,406
BRAKING SYSTEM FOR VEHICLES
Filed July 31, 1947
INVENTOR.
GLYN P. ROBERTS
BY
T. J. Plante
ATTORNEY

BRAKING SYSTEM FOR VEHICLES

Glyn P. Roberts, Wolverhampton, England, assignor to Bendix Aviation Corporation, South Bend, Ind.

Application July 31, 1947, Serial No. 765,052
In Great Britain December 9, 1938

Section 1, Public Law 690, August 8, 1946
Patent expires December 9, 1958

2 Claims. (Cl. 188—106)

The present invention relates to improvements in braking systems for vehicles and particularly to braking systems applied to a motor vehicle provided with brakes on the front and rear wheels.

An important object of the present invention is to provide a vehicle braking system in which the brakes on the front wheels are of a fundamentally different type from those on the rear wheels, in order to obtain a greatly increased overall braking effectiveness when the vehicle is moving in the forward direction, with a minimum increase in the cost of the vehicle braking system.

Another object of the invention is to provide a braking system in which the front wheels receive a greater fraction of the total braking effort than that transmitted to the rear wheels, thus taking into consideration the dynamic transfer of load towards the front as the brakes are set into action.

Another object of the invention is to realize an automatic distribution of the braking effort applied to the front and rear wheels with a conventional hook-up without any auxiliary means varying the distribution.

I propose to obtain the foregoing objects by providing a braking system for vehicles comprising two-leading-shoe brakes (preferably of the type in which the shoes are leading in only one direction) on the front, and non-servo brakes on the rear, with two shoes pivoted on their adjacent ends on a fulcrum means, whereby, due to the higher efficiency of the two leading shoe brakes, a larger proportion of the total braking effort is produced by the front brakes.

Other objects and meritorious features of my invention will be more fully appear from the following specification and accompanying drawings relating to two practical layouts for vehicle braking systems.

Figure 1 is a diagrammatic illustration of an embodiment of the present invention utilizing a mechanical brake actuating linkage;

Figure 2 is a diagrammatic illustration of another embodiment wherein the front brakes are actuated hydraulically and the rear brakes mechanically; and Figure 3 is an enlarged fragmental section of a brake.

In the layout shown in Figure 1 a pedal 10 actuates longitudinal brake rods 11, 12 through a compensator or equalizer 13, and these rods actuate the front and rear brakes respectively through further compensators or equalizers 14, 15 and transverse rods 16, 17. The longitudinal rod 12 for the rear brakes can also be actuated by a hand lever 18 for parking.

The brakes 19 on the front wheels are of the two-shoe type in which both shoes act as leading shoes in the normal or in both directions of rotation of the drum. In other words, the two shoes of each of the front wheel brakes are both self-energizing and are individually applied at least in the forward, or normal, direction of vehicle movement. The front wheel brakes 19 may be of the type in which both shoes are "leading" in both directions, or in one direction only. In general, I prefer to provide front wheel brakes in which both shoes are leading only when the vehicle is moving forward, because such brakes can be manufactured at considerably less cost than brakes in which both shoes are leading in both directions. Furthermore, the provision of front wheel brakes having shoes which are self-energizing when the vehicle is moving backward is not particularly important, for reasons which will be hereinafter explained.

The brakes 20 on the rear wheels are of the two-shoe type in which both shoes are pivoted about a fixed fulcrum means so that only one shoe acts as a leading shoe in each direction of rotation of the drum. In other words, the rear wheel brakes are of conventional "non-servo" design, which is the least costly type of internal shoe brake construction available. Using brakes of this type on the rear wheels, in addition to the cost reduction advantage, provides a shoe on each side of the vehicle which is self-energizing when the vehicle is moving backward, and which is located at the rear of the vehicle, where it will do the most good in reverse braking.

The brakes of the vehicle are illustrated in diagram as having a plurality of individually self-energizing shoes and a lesser number of non-self-energizing shoes. The front brakes each incorporate a pair of shoes 24 and 25, a brake drum 26, and a support plate 27. The rear brakes each incorporate a pair of shoes 28 and 29, a brake drum 30, and a support plate 31. The said shoes are adapted to be moved against the respective drums and to anchor at one end on their respective anchors. For purposes of brevity, only one of the front and one of the rear brakes are shown in detail, it being understood that the other of said brakes corresponds in construction to its companion brake. The shoes 24 and 25 of the front brake 19 anchor on diametrically opposite pivots 34 and 35, respectively, and are adapted to be individually moved into engagement with the drum 26 by means of the wedge-shaped actuators 36 and 37, respectively, each being guided in a suitable slot 38 in the backing plate 27 between the applying and anchoring ends of the respective shoes. The narrow ends of said actuators are respectively pivotally connected to the ends of links 39 and 40 which are pivoted on the ends of a floating lever 41 centrally pivoted to the end of transverse rod 42. By exerting a tension movement of this rod 42, the said actuators will be more deeply wedged between their respective shoe ends and the edges of the supporting plate slots, thereby urging the shoes into engagement with the drum. A pair of tension springs 43 and 44 are shown connected between the shoes to normally hold the brakes in released position.

The shoes 28 and 29 of the rear brake 20 fulcrum on adjacent pivots 45 and 46, respectively, and are adapted to be moved into engagement with the drum 30 by means of a single wedge-shaped actuator 47 guided in a suitable slot 48 in plate 49 between the applying ends of the two shoes.

In operation, depression of the pedal 10 will cause a corresponding inward longitudinal movement of transverse rods 16 and 17 by virtue of the intermediate linkage connection heretofore referred to. The wedge actuators of the front brakes are then moved to force the shoes against the drums and inhibit rotation thereof. Assuming that rotation of the brake drums is in the direction indicated by the arrows F as forward, the wrapping effect of the drum will act on the shoes 24 and 25 to augment the applying action of the actuators 36 and 37. At the same time the shoes 28 and 29 in the rear wheel brake will fulcrum on their respective pivots 45 and 46. As explained previously, both shoes of the front brakes are self-energized while only half of the rear brake shoes are self-energized thereby providing a greater braking pressure at the front of the vehicle than at the rear.

The conventional passenger vehicle has a static weight distribution of approximately 50% front and 50% rear. Deceleration while the vehicle is moving forwardly unbalances the weight distribution to place the greater weight on the front axle. Owing to this, most passenger vehicle brakes have larger capacity brakes on the front than on the rear, the purpose being to proportion the braking effect at the wheels in accordance with the dynamic load on the wheels.

During reverse braking the weight distribution is shifted to put a higher percentage of weight on the rear brakes than on the front. In this instance it becomes desirable to have greater braking effect on the rear brakes than on the front brakes, but under the condition described in the preceding paragraph, exactly the opposite is the case.

By placing brakes of the conventional shoe type on the front wherein both shoes are self-energizing when the vehicle is travelling in a forward direction, and brakes of a similar type on the rear wherein only one shoe is self-energizing in the same direction, a satisfactory arrangement is achieved whereby the front brakes supply a greater braking effort than the rear brakes for forward movement of the vehicle.

It has been found that such an arrangement is more economical to manufacture than any other similar combination arrangement heretofore known. Further, braking efficiency is kept at its highest even though a saving in economy has been effected. Still further, this arrangement provides for a facile method for retarding the forward motion of a vehicle, the operator being relieved of the effort necessary to effect such retardation by virtue of the self-energization of the brake shoes. All of these advantages, when blended together, provide for a novel braking system for passenger vehicles not heretofore conceived.

In actual operation, the effect of the two self-energizing shoes in each of the front brakes will produce a substantially greater braking torque than that of the non-servo brakes mounted on the rear.

In the layout shown in Figure 2 the shoes in the front wheel brake are operated hydraulically by pressure fluid from a floating master cylinder 21. This particular brake arrangement is identical in construction to that of the corresponding brake of Figure 1 with the exception that one-way wheel cylinders 50 and 51 are used to move the shoes into the drum instead of the wedge actuators of Figure 1. These wheel cylinders are connected for communication with the master cylinder by means of the conduits 52, 53, and 54. Pressure is applied to the piston in the master cylinder by the pedal 22 and the reaction on the master cylinder applies the rear brakes mechanically through a rod 23. By this means the force applied to the pedal is distributed equally between the front and rear brakes.

This method of operation is particularly suitable for vehicles having independently sprung front wheels.

While two illustrative embodiments have been described in detail, it is not my intention to limit the scope of the invention to those particular embodiments or otherwise than by the terms of the appended claims.

What I claim is:

1. A braking system comprising a set of hydraulically actuated front wheel brakes, a set of mechanically actuated rear wheel brakes, a single control means including a direct mechanical connection with said rear brakes and a hydraulic connection to said front wheel brakes, whereby both sets of brakes are applied simultaneously by the same control means.

2. A braking system comprising a set of hydraulically actuated front wheel brakes, a set of mechanically actuated rear wheel brakes, a hydraulic master cylinder device having a pressure creating piston and having a pressure fluid connection with said front wheel brakes, whereby actuation of said device will actuate said front brakes and a mechanical connection between said master cylinder device and said rear brakes for transmitting actuating pressure from said device to said rear brakes, said front and rear wheel brakes thereby being applied simultaneously.

GLYN P. ROBERTS.

References Cited in the file of this patent

UNITED STATES PATENTS

| Number | Name | Date |
| --- | --- | --- |
| 1,547,889 | Waseige | July 28, 1925 |
| 1,761,933 | Olivier | June 3, 1930 |
| 1,872,226 | Bendix | Aug. 16, 1932 |
| 1,930,032 | Apple | Oct. 10, 1933 |
| 2,022,046 | La Brie | Nov. 26, 1935 |
| 2,067,570 | Hoffman | Jan. 12, 1937 |
| 2,249,220 | McCann | July 15, 1941 |
| 2,272,335 | Boldt | Feb. 10, 1942 |

FOREIGN PATENTS

| Number | Country | Date |
| --- | --- | --- |
| 213,938 | Great Britain | June 19, 1924 |
| 515,958 | Great Britain | Dec. 19, 1939 |